United States Patent [19]

Morby et al.

[11] Patent Number: 4,667,269

[45] Date of Patent: May 19, 1987

[54] CIRCUIT BREAKER SUPPORT SADDLE HAVING A SPLIT NEUTRAL CONNECTOR

[75] Inventors: John A. Morby, Farmington; Robert J. Sabatella, Southington, both of Conn.; George L. Shuttleworth, Amsterdam, N.Y.

[73] Assignee: General Electric Company, New York, N.Y.

[21] Appl. No.: 802,350

[22] Filed: Nov. 27, 1985

[51] Int. Cl.⁴ .............................................. H02B 1/04
[52] U.S. Cl. ..................... 361/355; 174/92; 336/175; 361/361; 361/363; 361/376
[58] Field of Search .............................. 174/92, 138 E; 339/22 B, 198 N; 336/174, 175; 361/346, 353, 355, 358, 361, 363, 376

[56] References Cited

U.S. PATENT DOCUMENTS

| | | | |
|---|---|---|---|
| 2,809,230 | 10/1957 | Moses et al. | 174/138 E |
| 3,278,807 | 10/1966 | Galante et al. | 361/119 |
| 4,029,896 | 6/1977 | Skinner | 174/92 |
| 4,167,769 | 9/1979 | Luke et al. | 361/355 |
| 4,426,108 | 1/1984 | Kesselman | 174/92 |
| 4,536,823 | 8/1985 | Ingram et al. | 361/355 |

*Primary Examiner*—A. D. Pellinen
*Assistant Examiner*—Gregory D. Thompson
*Attorney, Agent, or Firm*—Richard A. Menelly; Walter C. Bernkopf; Fred Jacob

[57] ABSTRACT

A molded case circuit breaker plastic support saddle includes means integrally formed therein for supporting the main bus conductors along with neutral conductors. The neutral conductors are arranged as a pair of conductors parallel with and outboard of the main bus conductors. Interconnection between the neutral conductors is made by a C-shaped insulated metal crossarm contained within a two-part insulating casing. This arrangement of the main bus conductors and neutral conductors allows for robotic assembly in a high speed manufacturing process.

8 Claims, 5 Drawing Figures

CIRCUIT BREAKER SUPPORT SADDLE HAVING A SPLIT NEUTRAL CONNECTOR

BACKGROUND OF THE INVENTION

U.S. patent application Ser. No. 802,347 filed Nov. 27, 1985 entitled "Molded Case Circuit Breaker Modular Support Assembly", Ser. No. 802,349 filed Nov. 27, 1985 entitled "Adaptor for Molded Case Circuit Breaker Support Saddle", Ser. No. 802,348 filed Nov. 27, 1985 entitled "Circuit Breaker Support Saddle with Removable Phase Barriers" all describe modular plastic saddle assemblies for circuit breaker load centers and panelboards. These applications are filed concurrently with the instant application and are incorporated herein for purposes of reference.

U.S. Pat No. 3,278,807 entitled "Panel Assembly with Frictionally Held Bus Bars" discloses a circuit breaker panelboard having a "split neutral" configuration wherein a pair of main bus conductors. The neutral conductors are interconnected at one end by means of an insulated wire. This patent describes a circuit breaker mounting saddle fabricated from a sheet metal stamping with insulation added to provide electrical isolation between the circuit breakers and the saddle. The combined use of a metal saddle with added insulation does not readily lead to automation during the panelboard assembly process.

U.S. Pat. No. 4,167,769 entitled "Panelboard Having Distributed Neutral" discloses an insulative plastic circuit breaker support panel with means integral to the saddle for supporting the circuit breakers along with the main bus and neutral bus conductors. The conductor used for interconnecting the neutral conductor pair is not insulated.

The purpose of this invention is to describe a circuit breaker support saddle having means for supporting the circuit breakers, main and neutral busses, branch straps as well as the neutral crossbar connector. The arrangement of these components facilitates down-loading of the circuit breaker and conductor components to facilitate robotic assembly in a high speed automated manufacturing process.

SUMMARY OF THE INVENTION

A molded plastic circuit breaker support saddle includes circuit breaker hooks, main bus support posts and neutral conductor support posts integrally formed within the top surface of the saddle. A C-shaped insulated metal crossarm electrically interconnects the outboard neutral conductors by means of a downloaded automated assembly process and a two-piece molded insulative enclosure is automatically assembled to the crossarm either prior to or subsequent to attachment to the circuit breaker support saddle assembly.

DESCRIPTION OF THE PREFERRED EMBODIMENT

Figure 1:
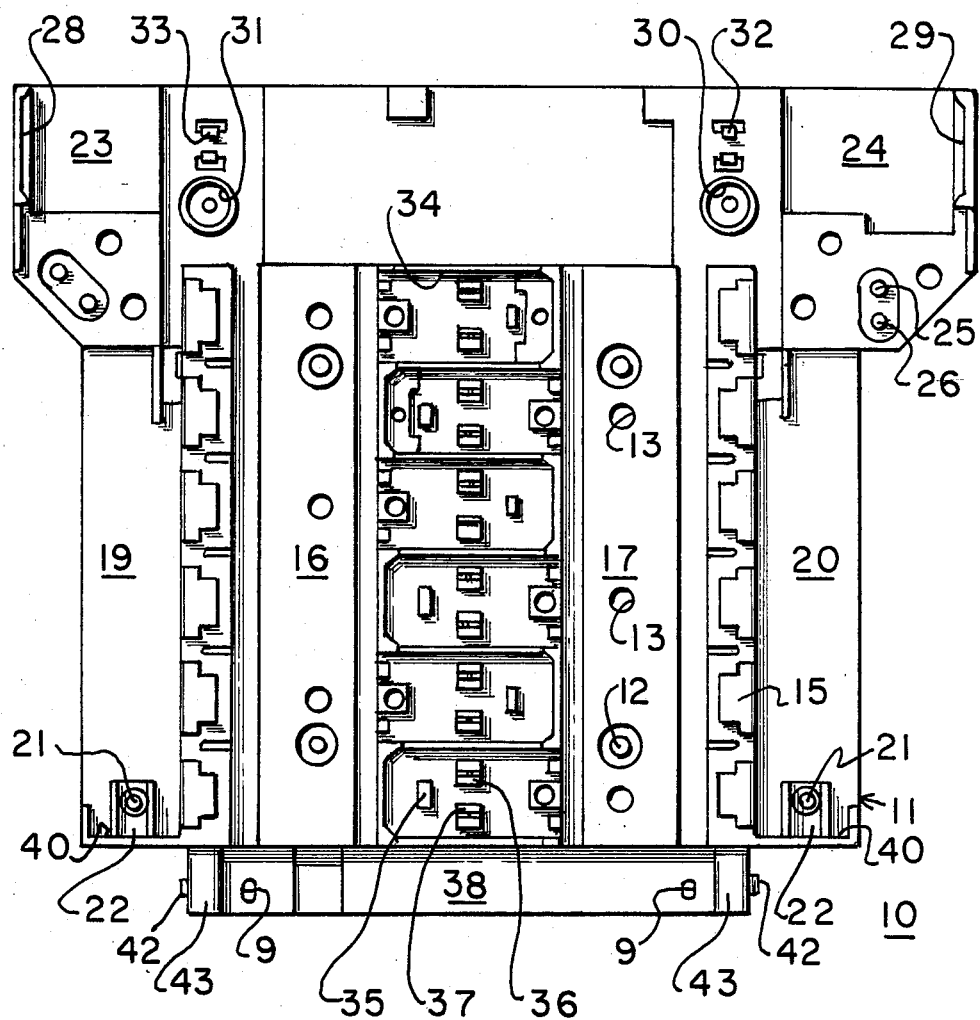
FIG. 1 is a plan view of a plastic circuit breaker support saddle for use with the split neutral connector of the invention.

A plastic circuit breaker support saddle 10 is shown in FIG. 1 to consist of a support 11 having a plurality of posts 12 and circular recesses 13 integrally formed therein for supporting the circuit breaker main bus conductors. A plurality of circuit breaker hooks 15 are formed on either side of planar surfaces 16–17 which serve to insulate the main busses and branch straps when attached to the saddle. A pair of planar surfaces 19, 20 serve to support and insulate the neutral conductors when attached to the support by means of posts 21 and pedestals 22 formed at one end. As described in the aforementioned U.S. patent applications, a pair of upright barriers 28, 29 are arranged at one end of the support to insulate the main bus terminals at the one end and end barriers 40 are provided at the opposite end for electrically isolating the neutral conductors from the remaining components within the load center or panelboard enclosure. To attach the saddle to the load center or panelboard bottom pan (not shown) a pair of tubular extensions 30, 31 are provided at one end and a pair of slots 9 are provided at an opposite end for passing screws through for attachment to the bottom pan. A pair of raised platforms 23, 24 are provided approximate the tubular extensions for supporting the ends of the neutral conductors and a pair of split posts 32, 33 are integrally formed within the support and extend upright from the surface of the support for interconnection with a main circuit breaker adaptor module as described within one of the aforementioned U.S. patent applications. A pair of projections 42 are provided, one at each end of the inverted U-shaped rails 43 for attachment of the extension module in cooperation with the step 38 integrally formed within the support and as fully described in another aforementioned U.S patent application. To support the circuit breaker branch straps 48 shown attached in FIG. 3, a plurality of posts 36, 37 and stops 35 are arranged along the support intermediate the main bus conductors and a plurality of phase barriers 34 are integrally formed within the support and extend upright from a top surface thereof to provide electrical insulation between each of the branch straps.

Figure 2:
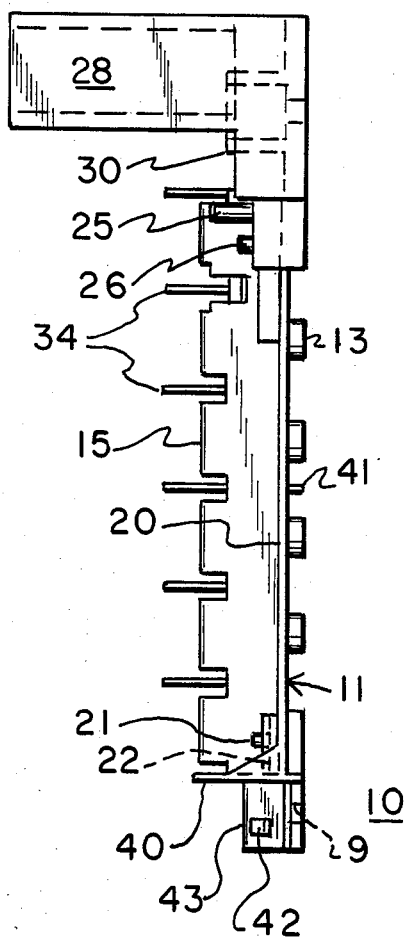
FIG. 2 is a side view of the circuit breaker saddle depicted in FIG. 1.

The plastic saddle 10 is shown in FIG. 2 for purposes of illustrating the differences in height between the upright barrier 28 at one end, the end barrier 40 at an opposite end as well as the height differences between the phase barriers 34 and the hooks 15 all integrally formed within the support. The tubular extension 30 and slot 9 are depicted at opposite ends of the support for providing means for attachment between the circuit breaker support saddle and the load center or panelboard bottom pan as described earlier. Ribs 41 integrally formed within the bottom surface of the support extend transversely across the support and in cooperation with the bottom of the circular recesses 13 serve to separate the bottom of the support from the load center or panelboard bottom pan. The closed bottoms of the circular recesses 13 further serve to electrically insulate the screws used for attaching the branch straps to the main bus conductors. The planar surface 20 also serves to electrically insulate the bottom of the neutral conductor form the load center or panelboard mounting pan. As described earlier, the projection 42 on one side of the inverted U-shaped rail 43 facilitates attachment with the adaptor module when attached to the support for those load center and panelboard designs requiring increased numbers of circuit breakers.

Figure 3:
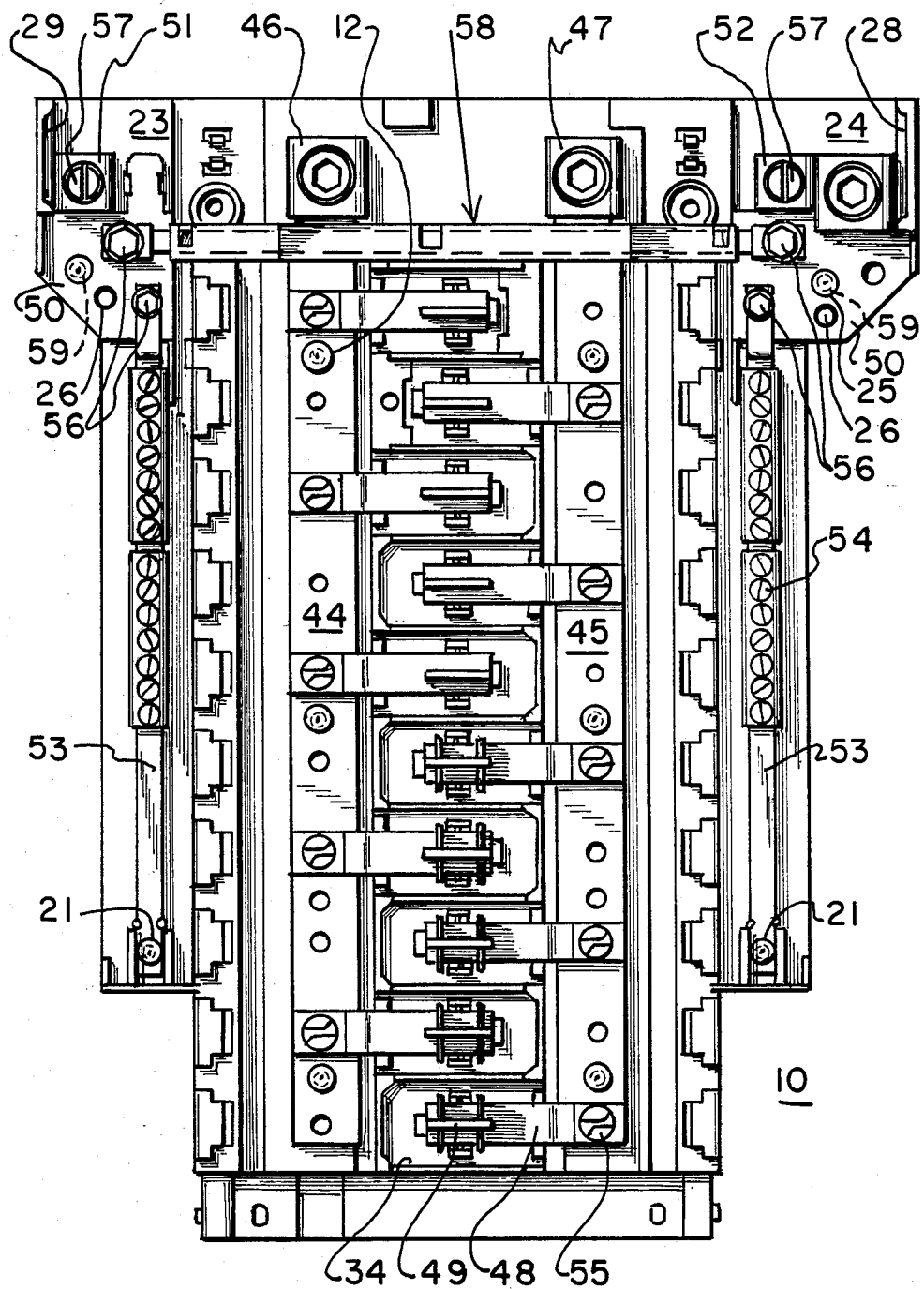
FIG. 3 is a plan view of the circuit breaker of FIG. 1 containing the crossarm connector of the invention.

The plastic support saddle 10 is shown in FIG. 3 with the main bus conductors 44, 45 mounted to the support by means of posts 12 which extend through openings in the conductor and are ultrasonically formed over. A plurality of branch straps 48 are fastened to the main bus conductors by means of screws 55 which extend within the circular recesses 13 shown earlier in FIG. 2. A pair of main bus lugs 46, 47 are fastened to one end of the bus conductors for electrical connection with the external power circuit. The upright barriers 28, 29 electrically insulate the main lugs 46, 47 along with the neutral lugs 51, 52 from the remainder of the load center or panelboard interior. The neutral lugs are attached to a conductive plate 50 located by means of posts 26 on each of the platforms 23, 24 of FIG. 1 and are fastened to the supports by means of posts 25, which extend through openings 59 provided in the plates and are ultrasonically formed over. Each neutral conductor 53 which contains a plurality of neutral terminal connectors 54 is attached at one end to the conductive plate 50 by means of a screw 56 and is attached at the opposite end by means of a post 21 which extends through an opening in the neutral conductor and is ultrasonically formed over. After the main bus conductors and neutral conductors are attached to the support, a plurality of branch straps 48 are attached to the main bus conductors by means of the screws 55 as described earlier. For positioning the circuit breaker stabs 49, corresponding pairs of phase barriers 34 are integrally formed within the support and extend upright therefrom. An insulated C-shaped metal crossarm 58 is next attached to threaded openings within each of the conductive plates 50 by means of screws 56. Screws 57 through neutral lugs 51, 52 allow for electrical connection with each of the neutral conductors 53 and the extrenal power circuit. The insulated metal crossarm 58 electrically interconnects the neutral conductors.

Figure 4:
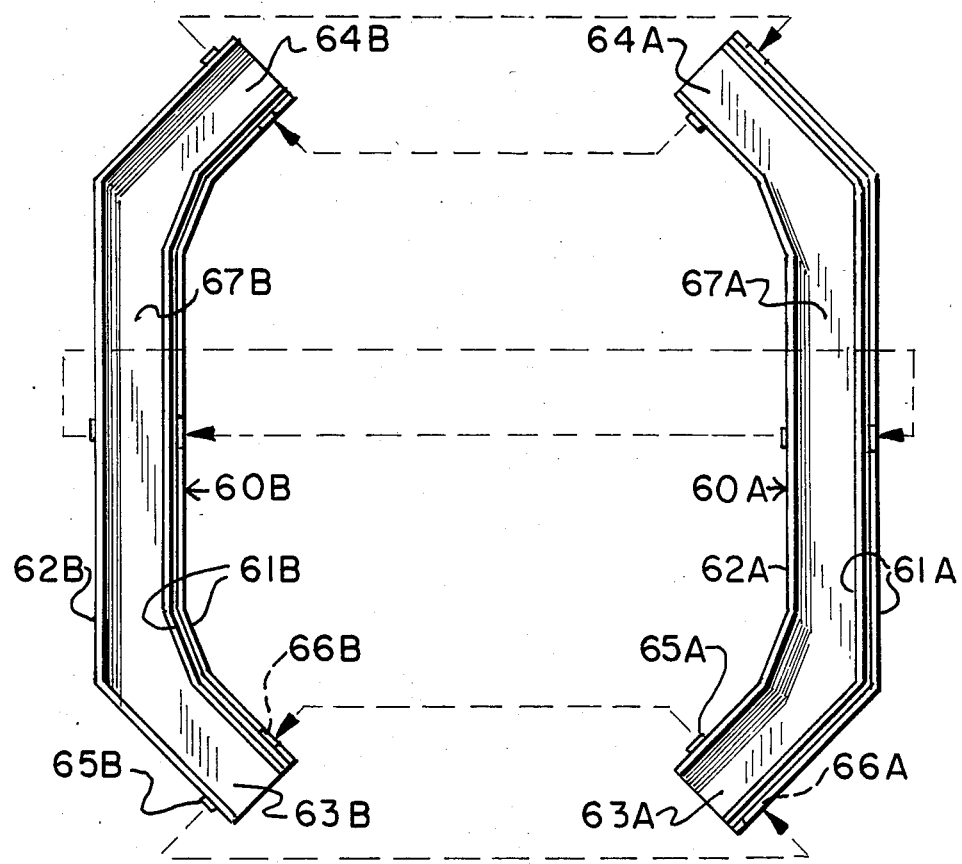
FIG. 4 is a plan view in horizontal isometric projection of the two halves of the insulative enclosure for the crossarm connector shown in FIG. 3.

Electrical insulation between the insulated metal crossarm 58 and the electrical components within the load center or panelboard enclosure is provided by means of the crossarm insulating enclosure parts 60A, 60B depicted in FIG. 4. Each of the corresponding elements for the two enclosure parts 60A, 60B are presented in a mirror image format to show how the integrally formed component parts interact upon connection. A pair of rails 61A receives a sidewall 62B while at the same time a pair of rails 61B receive the sidewall 62A when the two enclosure parts 60A, 60B are fitted together around the metal conductor 58A within the assembled insulated metal crossarm 58 shown in FIG. 4A. A plurality of projections 65A formed on the exterior of sidewall 62A snappingly engage a corresponding plurality of slots 66B formed on the exterior of rails 61B while a corresponding plurality of projections 65B along the outer surface of sidewall 62B snappingly engage complementary slots 66A formed within the outside surface of rails 61A. A continuous bottom portion 67A extends from a U-shaped opening 63A at one end to an opposite U-shaped opening 64A at an opposite end within component part 61A while a bottom 67B extends between a U-shaped opening 63B at one end to an opposite U-shaped opening 64B at an opposite end of enclosure part 60B.

Figure 4A:
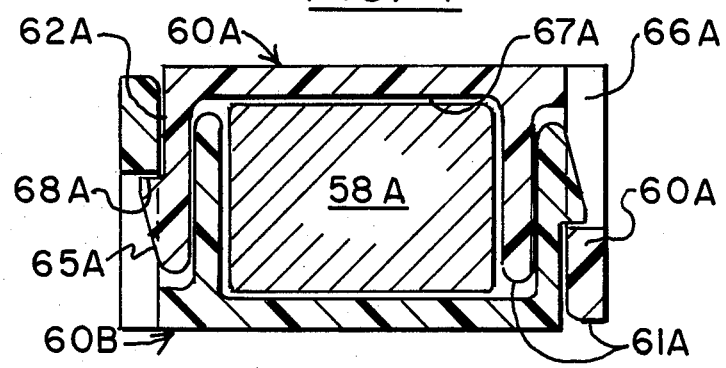
FIG. 4A is an enlarged cross-sectional view of one of the insulative enclosures shown in FIG. 4.

The unitary structure for enclosure parts 60A, 60B over the conductor 58A is shown in cross-section in FIG. 4A wherein only one set of reference numerals is depicted for purposes of clarity. The bottom portion 67A defines the bight of the U-shaped opening 64A of FIG. 4 while the legs of the bight are defined by sidewall 62A and rails 61A. The projection 65A extends angularly from the sidewall and a step 68A defined thereon provides a detent for the enclosure part when inserted within the complementary slot such as 66B. The slot 66A is shown formed in the outer one of the two rails 61A.

The insulated metal crossarm of the invention electrically interconnects the neutral conductors and is assembled in a downloaded procedure for automated fabrication of the entire saddle board assembly, as thus described. The insulation provided by means of the two part enclosure allows the crossarm to be insulated by automatically assembling the two parts either before or after the insulated metal crossarm is attached to the saddle.

Having described the invention, what we claim as new and desire to secure by Letters Patent is:

1. A circuit breaker support saddle comprising:
   a unitary molded plastic support having means integrally formed therein supporting main bus conductors and branch strap conductors;
   means outboard of said main bus conductors integrally formed within said support supporting a pair of neutral conductors;
   a pair of metal plates attached to a top surface of said unitary plastic support outboard of said main bus conductors;
   main bus lugs attached to a pair of said main bus conductors at one end;
   a pair of neutral lugs each of said neutral lugs being connected to one of said metal plates at one end; thereof and
   a C-shaped crossarm conductor electrically interconnecting said pair of neutral conductors, said crossarm conductor being encased within a two-piece plastic insulating enclosure, each end of said crossarm conductor being connected to one of said metal plates.

2. The circuit breaker support saddle of claim 1 including means integrally formed within said support and extending vertically from a back surface of said support for receiving attachment means on a main circuit breaker adapter module to thereby connect a main circuit breaker to said plastic support.

3. The circuit breaker support saddle of claim 1 wherein said two-piece enclosure comprises a first plastic molded part having a U-shaped cross section bounded by a first sidewall having a plurality of projections and bounded by a second sidewall consisting of a pair of rails, said pair of rails having a plurality of slots.

4. The circuit breaker support saddle of claim 3 wherein said two-piece enclosure further comprises a second plastic molded part having a U-shaped cross section bounded by a first sidewall having a plurality of projections and bounded by a second sidewall consisting of a pair of rails, said pair of rails having a plurality of slots.

5. The circuit breaker support saddle of claim 4 wherein said two-piece enclosure encloses said C-shaped crossarm conductor whereby said second sidewall of said first part encompasses said first sidewall of said second part.

6. The circuit breaker support saddle of claim 5 whereby said second sidewall of said second part encompasses said first sidewall of said first part.

7. The circuit breaker support saddle of claim 5 wherein said projections on said first sidewall on said second part extend within said slots on said second sidewall of said first part.

8. The circuit breaker support saddle of claim 6 wherein said projections on said first sidewall of said first part extend within said slots on said second sidewall of said first part.

* * * * *